United States Patent
Suzuki et al.

(10) Patent No.: US 10,414,946 B2
(45) Date of Patent: Sep. 17, 2019

(54) GOLF BALL PAINT COMPOSITION

(71) Applicants: Bridgestone Sports Co., Ltd., Tokyo (JP); ASIA INDUSTRY CO., LTD., Tokyo (JP)

(72) Inventors: Keisuke Suzuki, Tokyo (JP); Takashi Ohira, Chichibushi (JP); Akihiro Moriyama, Kuki (JP); Satoshi Ueno, Kuki (JP); Haruka Yoshida, Kuki (JP)

(73) Assignees: Bridgestone Sports Co., Ltd., Tokyo (JP); Asia Industry Co., Ltd., Tokyo (JP)

(*) Notice: Subject to any disclaimer, the term of this patent is extended or adjusted under 35 U.S.C. 154(b) by 0 days.

(21) Appl. No.: 15/297,441

(22) Filed: Oct. 19, 2016

(65) Prior Publication Data
US 2017/0107399 A1  Apr. 20, 2017

(30) Foreign Application Priority Data
Oct. 20, 2015  (JP) .................... 2015-206628

(51) Int. Cl.
| | |
|---|---|
| *A63B 37/00* | (2006.01) |
| *C09D 175/06* | (2006.01) |
| *C09D 133/06* | (2006.01) |
| *C08G 18/62* | (2006.01) |
| *C08G 18/40* | (2006.01) |
| *C08G 18/42* | (2006.01) |

(52) U.S. Cl.
CPC ........ *C09D 175/06* (2013.01); *A63B 37/0022* (2013.01); *C08G 18/4063* (2013.01); *C08G 18/4277* (2013.01); *C08G 18/6233* (2013.01); *C09D 133/066* (2013.01)

(58) Field of Classification Search
CPC .................................................. A63B 37/0022
See application file for complete search history.

(56) References Cited

U.S. PATENT DOCUMENTS

| | | | | |
|---|---|---|---|---|
| 5,312,868 | A * | 5/1994 | Abe | C08G 18/6225 524/590 |
| 6,454,667 | B1 * | 9/2002 | Iwami | A63B 37/0003 473/351 |
| 7,101,934 | B2 | 9/2006 | Shimura et al. | |
| 9,011,272 | B2 | 4/2015 | Isogawa et al. | |
| 2011/0244989 | A1 * | 10/2011 | Tarao | A63B 37/0022 473/385 |
| 2014/0200305 | A1 * | 7/2014 | Iwata | C09D 7/12 524/558 |
| 2017/0106245 | A1 * | 4/2017 | Kimura | A63B 37/0022 |

FOREIGN PATENT DOCUMENTS

| | | | |
|---|---|---|---|
| JP | 06166846 | * | 6/1994 |
| JP | 3072201 | B2 * | 7/2000 |
| JP | 2003-253201 | A | 9/2003 |
| JP | 2011-67595 | A | 4/2011 |

* cited by examiner

*Primary Examiner* — David J Buttner
(74) *Attorney, Agent, or Firm* — Sughrue Mion, PLLC

(57) ABSTRACT

A golf ball paint composition includes primarily a urethane paint made of a polyol and a polyisocyanate. The polyol is an acrylic polyol, and the composition has an elastic work recovery of at least 70%. The paint composition has a high self-repairing ability and is of high quality as a golf ball paint. Golf balls coated with this composition are able to maintain a good durability, in addition to which they have an excellent abrasion resistance and an excellent ball appearance.

8 Claims, No Drawings

GOLF BALL PAINT COMPOSITION

CROSS-REFERENCE TO RELATED APPLICATION

This non-provisional application claims priority under U.S.C. § 119(a) on Patent Application No. 2015-206628 filed in Japan on Oct. 20, 2015, the entire contents of which are hereby incorporated by reference.

TECHNICAL FIELD

The present invention relates to paint composition for golf balls.

BACKGROUND ART

The surface portion of a golf ball is often coated with a paint composition in order to protect the ball surface or to maintain an attractive appearance. Two-part curable polyurethane paints which are used by mixing together a polyol and a polyisocyanate just prior to application are suitably employed as such golf ball paint compositions for a number of reasons, including their ability to withstand large deformation and impacts (see, for example, JP-A 2003-253201).

Also, a frequent aim of recent golf ball development has been to even further lower the spin rate on full shots with a driver. This move toward lower spin rates has engendered a trend toward multilayer balls and, with it, a trend toward greater softness in the cover serving as the outermost layer of the ball.

Most golf balls have a core, a cover positioned outside of the core, and a paint film layer positioned outside of the cover. Making this paint film layer soft also often provides certain advantages, such as contributing to stability in the spin rate of the golf ball and imparting outstanding durability (see, for example, JP-A 2011-67595).

However, the surface of the paint film layer lacks a good abrasion resistance, and so there is room for further improvement.

SUMMARY OF THE INVENTION

It is therefore an object of this invention to provide a golf ball paint composition which can increase the abrasion resistance of the paint film and moreover is able to enhance the performance of golf balls coated with the composition.

As a result of extensive investigations, the inventors have found that, with regard to polyurethane paints composed of a polyol and a polyisocyanate, by using an acrylic polyol as the polyol component and preparing a paint composition such that the elastic work recovery becomes 70% or more, the paint film obtained with this paint composition has a high elastic strength and also has a high abrasion resistance due to a high self-repairing ability. The inventors have also found that the performance of golf balls coated with this paint composition can be enhanced.

Accordingly, the invention provides a golf ball paint composition composed primarily of a urethane paint that consists of a polyol and a polyisocyanate, wherein the polyol is an acrylic polyol and the composition has an elastic work recovery of at least 70%.

The acrylic polyol has a hydroxyl value of preferably at least 120 mgKOH/g.

The acrylic polyol has a weight-average molecular weight (Mw) of preferably from 30,000 to 120,000.

In the paint composition of the invention, the molar ratio of isocyanate (NCO) groups on the polyisocyanate to hydroxyl (OH) groups on the acrylic polyol, expressed as NCO/OH, is preferably at least 1.00.

The polyisocyanate is preferably a hexamethylene diisocyanate derivative or a non-yellowing isocyanate.

Advantageous Effects of the Invention

The golf ball paint composition of the invention has a high elastic strength, and thus a high self-repairing ability, and also has a high abrasion resistance as a golf ball paint. Moreover, the paint composition is able to enhance the performance of golf balls painted therewith.

DESCRIPTION OF THE PREFERRED EMBODIMENTS

The objects, features and advantages of the invention will become more apparent from the following detailed description.

The golf ball paint composition of the invention is composed primarily of a urethane paint consisting of a polyol and a polyisocyanate.

An acrylic polyol is used as the polyol component. As used herein, "acrylic polyol" encompasses acrylic polyols and/or modified acrylic polyols. Other polyols may be added in order to further enhance the workability.

The acrylic polyol is exemplified by homopolymers and copolymers of monomers having functional groups that react with isocyanate. Such monomers are exemplified by alkyl (meth)acrylate esters, illustrative examples of which include methyl (meth)acrylate, ethyl (meth)acrylate, isopropyl (meth)acrylate, butyl (meth)acrylate, isobutyl (meth)acrylate, 2-ethylhexyl (meth)acrylate, lauryl (meth)acrylate, stearyl (meth)acrylate, cyclohexyl (meth)acrylate, isobornyl (meth)acrylate, 2-hydroxyethyl (meth)acrylate, 2-hydroxypropyl (meth)acrylate and 4-hydroxybutyl (meth)acrylate. These may be used singly or two or more may be used together.

Modified acrylic polyols that may be used include polyester-modified acrylic polyols. Examples of other polyols include polyether polyols such as polyoxyethylene glycol (PEG), polyoxypropylene glycol (PPG) and polyoxytetramethylene glycol (PTMG); polyester polyols that are condensation products, such as polyethylene adipate (PEA), polybutylene adipate (PBA) and polyhexamethylene adipate (PH2A); lactone-type polyester polyols such as poly-ε-caprolactone (PCL); and polycarbonate polyols such as polyhexamethylene carbonate. These may be used singly or two or more may be used together. These polyols account for a proportion of the total amount of acrylic polyols that is preferably 50 wt % or less, and more preferably 40 wt % or less.

The acrylic polyol used in the invention has a weight-average molecular weight (Mw) which, although not particularly limited, is preferably from 30,000 to 120,000, and more preferably from 50,000 to 120,000. When the acrylic polyol has a weight-average molecular weight in excess of 120,000, the productivity as a golf ball paint may worsen. On the other hand, when the acrylic polyol has a weight-average molecular weight of less than 30,000, the flowability of the golf ball paint may be too high, making it difficult to coat the golf balls to a suitable film thickness, as a result of which suitable golf ball paint film properties may not be obtained. The weight-average molecular weight is a polystyrene equivalent value measured by gel permeation chromatography (GPC) using a differential refractometer.

The hydroxyl value of the acrylic polyol used in the invention is not particularly limited. However, from the standpoint of the self-repairing ability of the paint film, the hydroxyl value is preferably at least 120 mgKOH/g, and more preferably in the range of 140 to 200 mgKOH/g. At a hydroxyl value of less than 120 mgKOH/g, the self-repairing ability may be small. On the other hand, when the hydroxyl value exceeds 200 mgKOH/g, the number of crosslink points rises, as a result of which the crosslinking time increases, which may worsen the efficiency of the painting operation. The hydroxyl value can be measured in accordance with JIS K 0070.

The polyisocyanate used in the invention is not particularly limited, so long as it is included as a curing agent for the polyol. For example, from the standpoint of properties such as weather resistance, a non-yellowing polyisocyanate (HMDI: methylenebis(4-cyclohexyl isocyanate)) or the like may be selected without particular limitation, with use typically being carried out in accordance with the desired performance. Preferred use can be made of, for example, hexamethylene diisocyanate (HDI), tolylene diisocyanate (TDI), xylylene diisocyanate (XDI) and isophorone diisocyanate (IPDI). The use of hexamethylene diisocyanate and modified forms or derivatives thereof is more preferred.

Modified forms of hexamethylene diisocyanate include, for example, polyester-modified hexamethylene diisocyanate and urethane-modified hexamethylene diisocyanate.

Derivatives of hexamethylene diisocyanate include the isocyanurate, the biuret and adducts of hexamethylene diisocyanate.

The molar ratio of isocyanate (NCO) groups on the polyisocyanate to hydroxyl (OH) groups on the acrylic polyol, expressed as NCO/OH, is typically in the range of 0.5 to 1.5, preferably from 0.8 to 1.2, and more preferably from 1.0 to 1.2. At less than 0.5, unreacted hydroxyl groups remain, which may worsen the performance and water resistance as a golf ball paint film. On the other hand, at more than 1.5, because the number of isocyanate groups becomes excessive, urea groups (which are fragile) form in reactions with moisture, as a result of which the golf ball paint film performance may decline.

An amine catalyst or an organometallic catalyst may be used as the curing catalyst. Examples of such organometallic compounds include soaps of metals such as aluminum, nickel, zinc or tin. Preferred use can be made of those which have hitherto been formulated as curing agents for two-part curing urethane paints.

Known paint compounding ingredients may be optionally added to the golf ball paint composition. For example, thickeners, ultraviolet absorbers, fluorescent brighteners, slip agents and pigments may be included in suitable amounts.

The golf ball paint composition has an elastic work recovery that must be at least 70%, and is preferably at least 80%. When the elastic work recovery of the inventive paint composition falls outside of this range, the abrasion resistance may worsen. In this invention, because the paint film that forms on the golf ball surface has a high elastic strength, the self-recovery ability is high, resulting in an outstanding abrasion resistance. It is also possible to improve various performance attributes of the golf balls coated with this paint composition. The method of measuring the elastic work recovery of the golf ball paint composition is described later in this specification.

The elastic work recovery is one parameter of the nanoindentation method for evaluating the physical properties of paint films, which is a nanohardness test method that controls the indentation load on a micro-newton (μN) order and tracks the indenter depth during indentation to a nanometer (nm) precision. In prior methods, only the size of the dent (plastic deformation) corresponding to the maximum load could be measured. However, in the nanoindentation method, the relationship between the indentation load and the indentation depth can be obtained by automated and continuous measurement. Hence, unlike in the past, there are no individual differences between observers when visually measuring deformation under an optical microscope, enabling the physical properties of the paint film to be evaluated to a high precision. Given that the paint film on the golf ball surface is strongly affected by the impact of drivers and various other clubs, and thus has a not inconsiderable influence on the golf ball properties, measuring the golf ball paint film by the nanohardness test method and carrying out such measurement to a higher precision than in the past is a very effective method of evaluation.

When using the paint composition of the invention, a paint film layer can be formed on the surface of a golf ball manufactured by a known method via the steps of preparing the paint composition at the time of application, applying the composition to the golf ball surface by a conventional painting process, and drying. The painting method is not particularly limited. Suitable use can be made of, for example, spray painting, electrostatic painting, dipping or the like.

As described above, the golf ball paint composition of the invention uses an acrylic polyol as the base resin and a polyisocyanate as the curing agent. Depending on the painting conditions, various types of organic solvents may be mixed together. Examples of such organic solvents include aromatic solvents such as toluene, xylene and ethylbenzene; ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone; ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon solvents such as mineral spirits.

The drying step may be similar to that for known two-part curing urethane paints. For the paint composition of the invention, the drying temperature may be set to at least about 40° C., and especially 40 to 60° C., and the drying time may be set to from 20 to 90 minutes, and especially 40 to 50 minutes.

The thickness of the paint film layer, although not particular limited, is typically from 5 to 40 μm, and preferably from 10 to 20 μm.

The paint composition may be used on any type of golf ball, including one-piece golf balls, two-piece solid golf balls having a core and a cover encasing the core, and multi-piece solid golf balls having a core of at least one layer and a multilayer cover encasing the core.

The cover is the part of the ball that encases the core. Examples include covers having at least one layer, including two-layer covers and three-layer covers. In the case of a two-layer cover, the inner layer is called the "intermediate layer" and the outer layer is called the "outermost layer." In the case of a three-layer cover, the respective layers are referred to as, in order from the inside, the "envelope layer," the "intermediate layer" and the "outermost layer." The outside surface of the outermost layer typically has numerous dimples formed thereon for the purpose of enhancing the aerodynamic properties.

The materials making up the various layers of the cover are not particularly limited. These may be formed of, e.g., ionomer resins, polyester resins, polyamide resins, and also polyurethane resins. For example, the intermediate layer may be formed of an ionomer resin or a highly neutralized ionomer resin, and the outermost layer may be formed of a polyurethane resin.

The core may be formed using a known rubber material as the base material. A known base rubber such as a natural rubber or a synthetic rubber may be used as the base rubber.

More specifically, the use of primarily polybutadiene, especially cis-1,4-polybutadiene having a cis structure content of at least 40%, is recommended. Where desired, a natural rubber, polyisoprene rubber, styrene-butadiene rubber or the like may be used in the base rubber together with the above polybutadiene. The polybutadiene may be synthesized with a titanium-based, cobalt-based, nickel-based or neodymium-based Ziegler catalyst or with a metal catalyst such as cobalt or nickel.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be blended with the base rubber. In addition, where necessary, other ingredients such as commercial antioxidants may suitably added.

The paint film formed of the above paint composition thus has an excellent abrasion resistance and moreover is able to enhance the performance of golf balls, such as by preventing a marked decline in the spin performance of balls that have been painted with the paint composition, even when the balls are repeatedly struck with golf clubs.

EXAMPLES

Synthesis Examples, Working Examples of the invention and Comparative Examples are given below by way of illustration, although the invention is not limited by these Examples.

Working Examples 1 to 6, Comparative Examples 1 and 2

A core-forming rubber composition formulated as shown in Table 1 was prepared and then cured and molded at 155° C. for 15 minutes, thereby producing cores having a diameter of 36.3 mm. Next, the cover layers (these being, in order from the inside: an envelope layer, an intermediate layer and an outermost layer) formulated of the resin materials shown in the same table were successively injection-molded over the core.

The envelope layer had a thickness of 1.3 mm and a material hardness, expressed in terms of Shore D hardness, of 52. The intermediate layer had a thickness of 1.1 mm and a material hardness, expressed in terms of Shore D hardness, of 62. The outermost layer had a thickness of 0.8 mm and a material hardness, in terms of Shore D hardness, of 47. When injection molding of the outermost layer was carried out, numerous dimples were formed at the same time on the outside surface of the outermost layer.

TABLE 1

| Golf ball parts | | Ingredients | Amounts |
| --- | --- | --- | --- |
| Cover | Outermost layer | T-8290 | 75 |
| | | T-8283 | 25 |
| | | Hytrel 4001 | 11 |
| | | Titanium oxide | 3.9 |
| | | Polyethylene wax | 1.2 |
| | | Isocyanate compound | 7.5 |
| | Intermediate layer | Himilan 1605 | 50 |
| | | Himilan 1557 | 15 |
| | | Himilan 1706 | 35 |
| | | Trimethylolpropane | 1.1 |
| | Envelope layer | HPF 1000 | 100 |
| Core | | Polybutadiene A | 80 |
| | | Polybutadiene B | 20 |
| | | Organic peroxide | 1 |
| | | Barium sulfate | 9 |
| | | Zinc oxide | 4 |
| | | Zinc acrylate | 43 |
| | | Water | 1.0 |
| | | Zinc salt of pentachlorothiophenol | 0.3 |

Details on the above core materials are given below. Numbers in the tables indicate parts by weight.
Polybutadiene A: Available under the trade name "BR 01" from JSR Corporation
Polybutadiene B: Available under the trade name "BR 51" from JSR Corporation
Organic peroxide: Dicumyl peroxide, available under the trade name "Percumyl D" from NOF Corporation
Barium sulfate: Available under the trade name "Barico #100" from Hakusui Tech
Zinc oxide: Available under the trade name "Zinc Oxide Grade 3" from Sakai Chemical Co., Ltd.
Zinc acrylate: Available from Nippon Shokubai Co., Ltd.
Water: Distilled water, from Wako Pure Chemical Industries, Ltd.
Zinc salt of pentachlorothiophenol: Available from Wako Pure Chemical Industries, Ltd.
Details on the cover (envelope layer, intermediate layer, and outermost layer) materials are given below. Numbers in the tables indicate parts by weight.
HPF 1000: An ionomer available from E.I. DuPont de Nemours & Co.
Himilan® 1605: A sodium-based ionomer available from DuPont-Mitsui Polychemicals Co., Ltd.
Himilan® 1557: A zinc-based ionomer available from DuPont-Mitsui Polychemicals Co., Ltd.
Himilan® 1706: A zinc-based ionomer available from DuPont-Mitsui Polychemicals Co., Ltd.
T-8290, T-8283: MDI-PTMG type thermoplastic polyurethanes available from DIC Bayer Polymer under the trademark Pandex.
Hytrel 4001: A polyester elastomer available from DuPont-Toray Co., Ltd.
Polyethylene wax: "Sanwax 161P" from Sanyo Chemical Industries, Ltd.
Titanium oxide: Tipaque R680, available from Ishihara Sangyo Kaisha, Ltd.
Polyisocyanate compound: 4,4'-Diphenylmethane diisocyanate
Formation of Paint Film Layer
Next, in each Example, the paint formulated as shown in Table 2 below was coated with an air spray gun onto the surface of the outermost layer on which numerous dimples had been formed, thereby producing golf balls having a 15 μm thick paint film layer formed thereon.

Elastic Work Recovery

The elastic work recovery of the paint was measured using a paint film sheet having a thickness of 100 μm. The ENT-2100 nanohardness tester from Erionix Inc. was used as the measurement apparatus, and the measurement conditions were as follows.

Indenter: Berkovich indenter
 (material: diamond; angle α: 65.030)
Load F: 0.2 mN
Loading time: 10 seconds
Holding time: 1 second
Unloading time: 10 seconds The elastic work recovery was calculated as follows based on the indentation work $W_{elast}$ (Nm) due to spring-back deformation of the paint film, and on the mechanical indentation work $W_{total}$ (Nm).

Elastic work recovery=$W_{elast}/W_{total} \times 100 (\%)$

TABLE 2

| | | | (parts by weight) | | | | | | | |
|---|---|---|---|---|---|---|---|---|---|---|
| | | | Working Example | | | | | | Comparative Example | |
| | | | 1 | 2 | 3 | 4 | 5 | 6 | 1 | 2 |
| Paint formulation | Base resin | Polyol 1 | 100.0 | | | | | | | |
| | | Polyol 2 | | 100.0 | | | | | | |
| | | Polyol 3 | | | 100.0 | | | | | |
| | | Polyol 4 | | | | 100.0 | | | | |
| | | Polyol 5 | | | | | 100.0 | | | |
| | | Polyol 6 | | | | | | 100.0 | | |
| | | Polyol 7 | | | | | | | 100.0 | 100.0 |
| | | Ethyl acetate | 60.0 | 60.0 | 60.0 | 60.0 | 60.0 | 60.0 | 100.0 | 100.0 |
| | | Propylene glycol monomethyl ether acetate | 40.0 | 40.0 | 40.0 | 40.0 | 40.0 | 40.0 | 40.0 | 40.0 |
| | | Curing catalyst | 0.03 | 0.03 | 0.03 | 0.03 | 0.03 | 0.03 | 0.03 | 0.03 |
| | Curing agent | Isocyanurate form of hexamethylene diisocyanate (1) | 71.0 | 63.0 | 52.5 | 52.5 | 52.5 | 52.5 | 25.9 | 20.5 |
| | | Polyester-modified hexamethylene diisocyanate (2) | | | | | | | 65.0 | 87.0 |
| | | Ethyl acetate | 29.0 | 37.0 | 47.5 | 47.5 | 47.5 | 47.5 | 29.1 | 12.5 |
| | Molar compounding ratio (NCO/OH) | | 1.08 | 1.08 | 1.08 | 1.08 | 1.08 | 1.08 | 1.08 | 1.08 |
| Properties | Elastic work recovery (%) | | 93.7 | 95.7 | 83.5 | 80.6 | 80.1 | 70.1 | 25.5 | 30.2 |
| | Film thickness (μm) | | 15 | 15 | 15 | 15 | 15 | 15 | 15 | 15 |

NCO molar ratio in Comparative Example 1:
Isocyanurate form of hexamethylene diisocyanate (1):Polyester-modified hexamethylene diisocyanate (2) = 0.67:0.41
NCO molar ratio in Comparative Example 2:
Isocyanurate form of hexamethylene diisocyanate (1):Polyester-modified hexamethylene diisocyanate (2) = 0.53:0.55

Synthesis Examples of Acrylic Polyols 1 to 7 in Table 2 are described below. In these Examples, all parts are given by weight.

Acrylic Polyol Synthesis Example 1

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 620 parts of polyester-containing acrylic monomer (Placcel® FM-3, from Daicel Chemical Industries, Ltd.), 317 parts of methyl methacrylate, 63 parts of 2-hydroxyethyl methacrylate and 18 parts of 2,2'-azobisisobutyronitrile was added dropwise over 4 hours. After the end of dropwise addition, the reaction was effected for 6 hours at the same temperature. Following reaction completion, 3,018 parts of butyl acetate and 3,000 parts of polycaprolactone diol (Praccel L205AL, from Daicel Chemical Industries, Ltd.) were charged and mixed in, giving a clear acrylic polyol resin solution (Polyol 1) having a solids content of 50%, a viscosity of 80 mPa·s (25° C.), a weight-average molecular weight of 30,000, and a hydroxyl value of 193 mgKOH/g (solids).

Acrylic Polyol Synthesis Example 2

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 620 parts of polyester-containing acrylic monomer (Placcel® FM-3, from Daicel Chemical Industries, Ltd.), 317 parts of methyl methacrylate, 63 parts of 2-hydroxyethyl methacrylate and 18 parts of 2,2'-azobisisobutyronitrile was added dropwise over 4 hours. After the end of dropwise addition, the reaction was effected for 6 hours at the same temperature. Following reaction completion, 1,378 parts of butyl acetate and 1,360 parts of polycaprolactone diol (Praccel L205AL, from Daicel Chemical Industries, Ltd.) were charged and mixed in, giving a clear acrylic polyol resin solution (Polyol 2) having a solids content of 50%, a viscosity of 230 mPa·s (25° C.), a weight-average molecular weight of 30,000, and a hydroxyl value of 171 mgKOH/g (solids).

Acrylic Polyol Synthesis Example 3

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 620 parts of polyester-containing acrylic monomer (Placcel® FM-3, from Daicel Chemical Industries, Ltd.), 317 parts of methyl methacrylate, 63 parts of 2-hydroxyethyl methacrylate and 18 parts of 2,2'-azobisisobutyronitrile was added dropwise over 4 hours. After the end of dropwise addition, the reaction was effected for 6 hours at the same temperature. Following reaction completion, 538 parts of butyl acetate and 520 parts of polycaprolactone diol (Praccel L205AL, from Daicel Chemical Industries, Ltd.) were charged and mixed in, giving a clear acrylic polyol resin solution (Polyol 3) having a solids content of 50%, a viscosity of 390 mPa·s (25° C.), a weight-average molecular weight of 30,000, and a hydroxyl value of 142 mgKOH/g (solids).

Acrylic Polyol Synthesis Example 4

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 620 parts of polyester-containing acrylic monomer (Placcel® FM-3, from Daicel Chemical Industries, Ltd.), 317 parts of methyl methacrylate, 63 parts of 2-hydroxyethyl methacrylate and 15 parts of 2,2'-azobisisobutyronitrile was added dropwise over 4 hours. After the end of dropwise addition, the reaction was effected for 6 hours at the same temperature. Following reaction completion, 535 parts of butyl acetate and 520 parts of polycaprolactone diol (Praccel L205AL, from Daicel Chemical Industries, Ltd.) were charged and mixed in, giving a clear acrylic polyol resin solution (Polyol 4) having a solids content of 50%, a viscosity of 510 mPa·s (25° C.), a weight-average molecular weight of 50,000, and a hydroxyl value of 142 mgKOH/g (solids).

Acrylic Polyol Synthesis Example 5

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 620 parts of polyester-containing acrylic monomer (Placcel® FM-3, from Daicel Chemical Industries, Ltd.), 317 parts of methyl methacrylate, 63 parts of 2-hydroxyethyl methacrylate and 12 parts of 2,2'-azobisisobutyronitrile was added dropwise over 4 hours. After the end of dropwise addition, the reaction was effected for 6 hours at the same temperature. Following reaction completion, 532 parts of butyl acetate and 520 parts of polycaprolactone diol (Praccel L205AL, from Daicel Chemical Industries, Ltd.) were charged and mixed in, giving a clear acrylic polyol resin solution (Polyol 5) having a solids content of 50%, a viscosity of 600 mPa·s (25° C.), a weight-average molecular weight of 70,000, and a hydroxyl value of 142 mgKOH/g (solids).

Acrylic Polyol Synthesis Example 6

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 620 parts of polyester-containing acrylic monomer (Placcel® FM-3, from Daicel Chemical Industries, Ltd.), 317 parts of methyl methacrylate, 63 parts of 2-hydroxyethyl methacrylate and 8 parts of 2,2'-azobisisobutyronitrile was added dropwise over 4 hours. After the end of dropwise addition, the reaction was effected for 6 hours at the same temperature. Following reaction completion, 528 parts of butyl acetate and 520 parts of polycaprolactone diol (Praccel L205AL, from Daicel Chemical Industries, Ltd.) were charged and mixed in, giving a clear acrylic polyol resin solution (Polyol 6) having a solids content of 50%, a viscosity of 800 mPa·s (25° C.), a weight-average molecular weight of 120,000, and a hydroxyl value of 142 mgKOH/g (solids).

Acrylic Polyol Synthesis Example 7

A reactor equipped with a stirrer, a thermometer, a condenser, a nitrogen gas inlet and a dropping device was charged with 1,000 parts of butyl acetate and the temperature was raised to 100° C. under stirring. Next, a mixture consisting of 220 parts of polyester-containing acrylic monomer (Placcel® FM-3, from Daicel Chemical Industries, Ltd.), 610 parts of methyl methacrylate, 170 parts of 2-hydroxyethyl methacrylate and 30 parts of 2,2'-azobisisobutyronitrile was added dropwise over 4 hours. After the end of dropwise addition, the reaction was effected for 6 hours at the same temperature. Following reaction completion, 180 parts of butyl acetate and 150 parts of polycaprolactone diol (Praccel L205AL, from Daicel Chemical Industries, Ltd.) were charged and mixed in, giving a clear acrylic polyol resin solution (Polyol 7) having a solids content of 50%, a viscosity of 100 mPa·s (25° C.), a weight-average molecular weight of 10,000, and a hydroxyl value of 113 mgKOH/g (solids).

Measurement of Molecular Weight

The molecular weight was measuring using the following apparatus.

Apparatus: HLC-8120 GPC, a high-speed gel permeation chromatography system from Tosoh Corporation
 Columns: two coupled TSKgel SUPER H200 columns
 Column Temperature: 40° C.
 Detector: differential refractometer
 Eluant: THF
 Column flow rate: 0.6 mL/min Measurement of Hydroxyl Value The hydroxyl value was measured in accordance with section 7.1 of JIS K 0070. Specifically, 2 to 3 g (solids) of the sample was precisely weighed out into a ground-joint Erlenmeyer flask, to which was then added 10 mL of an acetylating agent (pyridine:acetic anhydride=4:1), and the system was left to stand for 1 minute. Next, a boiling stone was added and a riser tube was attached to the flask, following which the acetylation reaction was carried out for 30 minutes on an approximately 120° C. hot plate while shaking the flask from time to time. When acetylation was complete, the system was allowed to cool, after which, with the riser tube remaining attached, the system was cooled with ice water. The ground joints on the riser tube and the Erlenmeyer flask were washed with 25 mL of pyridine (cooled), following which the ground joints on the riser rube and the flask were washed with 50 mL of distilled water (cooled). Next, the riser rube was removed, 4 or 5 drops of 1% phenolphthalein as the indicator was added, and titration with 1N KOH was carried out. The endpoint was taken as the point at which a red color continued for 30 seconds. In addition a blank test was carried out by the same method, and the hydroxyl value (mgKOH/g (solids)) was determined by formula (1) below.

$$\text{Hydroxyl value} = [\{(B-A) \times 56.1 \times f\} \times 1/C] + \text{acid value} \quad (1)$$

In formula (1), "A" is the amount (mL) of 1N KOH required for titration of the sample, "B" is the amount (mL) of 1N KOH required for titration of the blank, "f" is a 1N KOH factor, and "C" is the sampled amount (g).

The golf balls obtained in the respective Working Examples and Comparative Examples were evaluated according to the criteria described below for spin rate when struck with a middle iron, control performance (spin rate) on approach shots, and paint film appearance. The results are shown in Table 3.

Spin Rate when Struck with Middle Iron

A 6 iron (X-Blade CB manufactured by Bridgestone Sports Co., Ltd.) was used as the middle iron on a golf swing robot manufactured by Miyamae Co., Ltd. When striking Tour B330 golf balls manufactured by Bridgestone Sports Co., Ltd., adjustment was carried out so as to set the spin rate to about 6,000 rpm, the ball initial velocity to 55 m/s, and the launch angle to 15.5°.

The value obtained by subtracting the spin rate (rpm) of the ball in the respective Working Examples and Comparative Examples on the initial shot with a middle iron from the spin rate on the $30^{th}$ shot is shown in Table 3 as the "Increase from initial value after 30 shots (rpm)." The same place on the ball surface was repeatedly struck.

Control Performance on Approach Shots

Using a Tourstage TourLimited 101HB (loft angle, 58°) club manufactured by Bridgestone Sports Co., Ltd., the balls in the respective Working Examples and Comparative Examples were struck at a head speed (HS) of 20 m/s, the spin rates (rpm) in a dry state (humidity, 40%) and a wet state (a state where the clubface and the ball were both wetted with water) were measured, and the wet spin retention (wet spin rate/dry spin rate)×100(%)) was determined.

Paint Film Appearance (Evaluation of Ball Surface Appearance after Sand Abrasion Test)

A pot mill with an outside diameter of 210 mm was charged with about 4 kg of sand having a size of about 5 mm, and 15 golf balls were placed in the mill. The balls were stirred in the mill at a speed of about 50 to 60 rpm for 120 minutes, following which the balls were removed from the mill and the appearance of each ball was rated according to the following criteria.

Rating Criteria

Good: Ball surface was free of conspicuous peeling, blemishes, etc.

NG: Peeling due to abrasion, blemishes, diminished gloss, etc. are noticeable on ball surface.

Comparative Examples 1 and 2 which had soft paint film layers like those of above-cited JP-A 2011-67595, all of the golf balls obtained in the Working Examples of the invention had a good dry spin rate, wet spin rate and wet spin retention. Moreover, they did not experience a large increase in spin rate even when repeatedly struck with a middle iron. In addition, the sand abrasion test results were good; that is, the balls in the Working Examples all had a good paint film appearance.

Japanese Patent Application No. 2015-206628 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball paint composition comprising a urethane paint which consists of a polyol and a polyisocyanate, the polyol comprising an acrylic polyol and the composition having an elastic work recovery of at least 70%, wherein the acrylic polyol has a weight-average molecular weight (Mw) of from 30,000 to 120,000 and is composed of polyester-containing acrylic monomer, methyl methacrylate and 2-hydroxyethyl methacrylate, and wherein the acrylic polyol has a hydroxyl value of at least 120 mgKOH/g.

2. The paint composition of claim 1, wherein the molar ratio of isocyanate (NCO) groups on the polyisocyanate to hydroxyl (OH) groups on the acrylic polyol, expressed as NCO/OH, is at least 1.00.

3. The paint composition of claim 1, wherein the polyisocyanate is a hexamethylene diisocyanate derivative.

4. The paint composition of claim 1, wherein a polyol other than the acrylic polyol is included in an amount of 50 wt % or less of the total amount of the polyols.

5. A golf ball comprising a core and a cover encasing the core wherein the cover has at least one layer and a paint film is formed on a surface of an outermost layer of the cover, the paint film being formed of a paint composition comprising a urethane paint which consists of a polyol and a polyisocyanate, the polyol comprising an acrylic polyol and the composition having an elastic work recovery of at least 70%, wherein the acrylic polyol has a weight-average molecular weight (Mw) of from 30,000 to 120,000 and is composed of

TABLE 3

|  |  |  | Working Example | | | | | | Comparative Example | |
|---|---|---|---|---|---|---|---|---|---|---|
|  |  |  | 1 | 2 | 3 | 4 | 5 | 6 | 1 | 2 |
| Golf ball properties | Middle iron | Increase from initial value after 30 shots (rpm) | 190 | 140 | 160 | 90 | 160 | 190 | 240 | 270 |
|  | Approach shots | Dry spin rate (rpm) | 6,200 | 6,280 | 6,280 | 6,280 | 6,280 | 6,300 | 6,300 | 6,250 |
|  |  | Wet spin rate (rpm) | 3,760 | 3,500 | 3,362 | 3,450 | 3,440 | 3,610 | 3,400 | 3,450 |
|  |  | Wet spin retention (%) | 61 | 56 | 54 | 55 | 55 | 57 | 54 | 55 |
|  | Paint film appearance | Results after sand abrasion test | good | good | good | good | good | good | NG | NG |

The results shown in Table 3 on the golf ball properties demonstrate that, compared with the golf balls obtained in polyester-containing acrylic monomer, methyl methacrylate and 2-hydroxyethyl methacrylate, and wherein the acrylic polyol has a hydroxyl value of at least 120 mgKOH/g.

6. The paint composition of claim 5, wherein the molar ratio of isocyanate (NCO) groups on the polyisocyanate to hydroxyl (OH) groups on the acrylic polyol, expressed as NCO/OH, is at least 1.00.

7. The paint composition of claim 5, wherein the polyisocyanate is a hexamethylene diisocyanate derivative.

8. The golf ball of claim 5, wherein a polyol other than the acrylic polyol is included in an amount of 50 wt % or less of the total amount of the polyols.

* * * * *